United States Patent
Murakami

(10) Patent No.: US 8,243,247 B2
(45) Date of Patent: Aug. 14, 2012

(54) LIQUID CRYSTAL DISPLAY INCLUDING A HEAT CONDUCTING LAYER BETWEEN A POLARIZER AND THE BACKLIGHT

(75) Inventor: Nao Murakami, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 130 days.

(21) Appl. No.: 12/853,512

(22) Filed: Aug. 10, 2010

(65) Prior Publication Data

US 2011/0134384 A1 Jun. 9, 2011

(30) Foreign Application Priority Data

Aug. 10, 2009 (JP) .................................. 2009-185364

(51) Int. Cl.
*G02F 1/1333* (2006.01)
(52) U.S. Cl. ........................................ 349/161; 349/122
(58) Field of Classification Search ........................ None
See application file for complete search history.

(56) References Cited

U.S. PATENT DOCUMENTS

| | | | | |
|---|---|---|---|---|
| 5,757,443 A | * | 5/1998 | Kobayashi | 349/5 |
| 5,759,643 A | * | 6/1998 | Miyashita et al. | 428/1.31 |
| 6,935,753 B2 | * | 8/2005 | Takezawa et al. | 353/119 |
| 2005/0135118 A1 | * | 6/2005 | Takata | 362/615 |
| 2005/0195369 A1 | * | 9/2005 | Shikita et al. | 353/20 |
| 2007/0205706 A1 | * | 9/2007 | Yamada et al. | 313/110 |
| 2008/0211997 A1 | * | 9/2008 | Chen et al. | 349/96 |
| 2009/0303411 A1 | * | 12/2009 | Kawato et al. | 349/61 |

FOREIGN PATENT DOCUMENTS

| | | | | |
|---|---|---|---|---|
| JP | 4-142527 A | * | 5/1992 | |
| JP | 9-061815 A | | 3/1997 | |
| JP | 11-2804 A | * | 1/1999 | |
| JP | 2005-283619 A | * | 10/2005 | |

* cited by examiner

*Primary Examiner* — Mike Stahl
(74) *Attorney, Agent, or Firm* — Westerman, Hattori, Daniels & Adrian, LLP

(57) ABSTRACT

A liquid crystal display that can suppress an irregularity in temperature in planes of a liquid crystal cell and polarizers, which is caused by heat radiated from a backlight and can suppress depolarization caused by the temperature irregularity, in which, as compared with a conventional liquid crystal display, appearance defects are reduced. The liquid crystal display of the present invention includes a first polarizer 10, a liquid crystal cell 11, a second polarizer 12, a thermal control element 14 with a thermal conductivity of 0.3 W/(m·K) or higher, an air layer 15, and a backlight 13, which are arranged in this order.

19 Claims, 2 Drawing Sheets (A)　　　　　　　　(B)

LIQUID CRYSTAL DISPLAY INCLUDING A HEAT CONDUCTING LAYER BETWEEN A POLARIZER AND THE BACKLIGHT

CROSS-REFERENCE TO RELATED APPLICATION

This application claims priority from Japanese Patent Application No. 2009-185364 (application date: Aug. 10, 2009). The entire subject matter of the Japanese Patent Application is incorporated herein by reference.

BACKGROUND OF THE INVENTION

1. Field of the Invention

The present invention relates to a liquid crystal display.

2. Description of Related Art

In recent years, liquid crystal displays, in which images are formed by controlling light emitted from a backlight such as a cold-cathode tube or a light-emitting diode (LED) with a pair of polarizers and a liquid crystal cell, have been studied and have been put to practical use. An example of the configuration of a conventional liquid crystal display is shown in a sectional view of FIG. 3. As shown in FIG. 3, in this liquid crystal display, a first polarizer 90, a liquid crystal cell 91, a second polarizer 92, and a backlight (a cold-cathode tube) 93 are arranged in this order. In this liquid crystal display, heat radiated from the backlight 93 is nonuniformly transferred to the second polarizer 92, the liquid crystal cell 91, and the first polarizer 90, and thus, irregularities in temperature in planes of the second polarizer 92, the liquid crystal cell 91, and the first polarizer 90 and in the thickness directions of them occur. The temperature irregularities cause birefringence in them to occur, and cause depolarization in the planes of them to occur. This results in appearance defects that are an irregularity in black display (nonuniform black display) of the liquid crystal display.

In order to solve the problems of such appearance defects, a liquid crystal display in which a thermal diffusion film with a high thermal conductivity is formed on an outer side of the effective display region of a transparent insulating substrate composing a liquid crystal cell is proposed (JP 9-61815 A). In this liquid crystal display, heat transferred from a backlight to the liquid crystal cell is diffused rapidly by the thermal diffusion film, and thus, a temperature irregularity in a plane of the liquid crystal cell is suppressed.

SUMMARY OF THE INVENTION

However, in the liquid crystal display, the thermal diffusion film is formed on the outer side of the effective display region, and thus, a temperature irregularity in a plane of the liquid crystal cell and depolarization caused by the temperature irregularity are not suppressed sufficiently. Further, a temperature irregularity in planes of polarizers arranged on both sides of the liquid crystal cell, respectively, and depolarization caused by the temperature irregularity cannot be suppressed. Therefore, appearance defects are not reduced sufficiently in the liquid crystal display in which the thermal diffusion film is formed. As a screen of a liquid crystal display becomes large, an amount of heat radiated from the backlight becomes large and difficult to be controlled. Further, as next-generation technology, various liquid crystal displays each mounted with a thin backlight with high brightness and various liquid crystal displays each mounted with a partially controlled backlight are developed. In these liquid crystal displays, a space between the second polarizer and the backlight is small. Thus, a necessity for heat control is growing.

MEANS FOR SOLVING PROBLEM

The liquid crystal display of the present invention includes a first polarizer, a liquid crystal cell, a second polarizer, a thermal control element with a thermal conductivity of 0.3 W/(m·K) or higher, an air layer, and a backlight, which are arranged in this order.

As mentioned above, the liquid crystal display of the present invention includes a thermal control element with a thermal conductivity in the predetermined range and an air layer between the second polarizer and the backlight. Therefore, according to the liquid crystal display of the present invention, heat radiated from the backlight and transferred to each of the first polarizer, the liquid crystal cell, and the second polarizer can be uniform in each of them. Thus, a temperature irregularity in planes of the liquid crystal cell and the polarizers and depolarization caused by the temperature irregularity can be suppressed, and as compared with a conventional liquid crystal display, appearance defects are reduced.

DETAILED DESCRIPTION OF THE INVENTION

Figure 1:
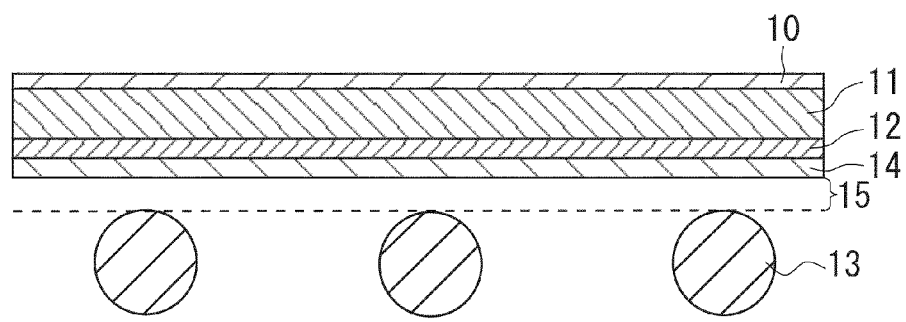
FIG. 1 is a schematical sectional view showing an example of the configuration of a liquid crystal display of the present invention.

Embodiments illustrating the present invention are described below with reference to drawings.

In the present invention, an air layer means space in other words. By arranging the air layer between the thermal control element and the backlight, heat radiated from the backlight is not directly transferred to the thermal control element, and a temperature irregularity in planes of the liquid crystal cell and the polarizers can be suppressed. Further, by the same, the thermal control element can be prevented from contacting the backlight in the case where, for example, the liquid crystal cell and the polarizers are curled by heat radiated from the backlight and at the time when the liquid crystal display is transported. Thus, occurrences of problems such as breakages of elements of the liquid crystal display, which are caused by a contact between the thermal control element and the backlight, disturbances of a brightness distribution and a heat distribution can be avoided. The thickness of the air layer is not particularly limited, and is, for example, in the range of 1 μm to 1 cm, and preferably in the range of 5 μm to 2 mm. Besides being arranged between the thermal control element and the backlight, the air layer may be arranged between the second polarizer and the thermal control element.

In the liquid crystal display of the present invention, the thermal control element preferably contains particles with a weight average particle size in the range of 0.001 to 20 μm.

In the liquid crystal display of the present invention, the particles preferably have a thermal conductivity of 0.3 W/(m·K) or higher.

In the liquid crystal display of the present invention, the particles preferably are at least one type of particles selected from the group consisting of alumina particles, boron nitride particles, silica particles, and aluminum nitride particles.

In the liquid crystal display of the present invention, the thermal control element may be formed using a formation material containing the particles and a resin for forming a thermal control element, and the particles may be dispersed in the resin for forming a thermal control element.

In the liquid crystal display of the present invention, the thermal control element may be formed using a formation material containing the particles and a resin for forming a thermal control element, and the particles may be arranged into a layer on a layer obtained by forming the resin for forming a thermal control element into a layer.

In the liquid crystal display of the present invention, the resin for forming a thermal control element preferably is an urethane acrylate ultraviolet curable resin.

In the liquid crystal display of the present invention, the thermal control element preferably has a thickness in the range of 10 to 200 µm.

It is preferable that the liquid crystal display of the present invention further includes a protective layer. The protective layer is used to, for example, prevent the first polarizer and the second polarizer from shrinking, expanding, and being degraded by ultraviolet light. It is preferable that the protective layer is arranged at least one of between the second polarizer and the thermal control element and between the thermal control element and the backlight.

In the liquid crystal display of the present invention, the thermal control element preferably is a thermal control film.

In the liquid crystal display of the present invention, the thermal control element preferably is laminated on the second polarizer.

Next, the liquid crystal display of the present invention is described with reference to examples.

An example of the configuration of the liquid crystal display of the present invention is shown in the sectional view of FIG. 1. As shown in FIG. 1, in this liquid crystal display, a first polarizer 10, a liquid crystal cell 11, a second polarizer 12, a thermal control element 14, an air layer 15, and a backlight 13 are arranged in this order. In FIG. 1, the air layer 15 is space formed between the backlight 13 and the thermal control element 14. In FIG. 1, the thickness of the air layer 15 is a distance of the upper end of the backlight 13 to the under surface of the thermal control element 14. In the present invention, the planar shape of the liquid crystal cell 11 is preferably a four-sided shape with 90° corners, and may be quadrate or rectangular. Preferably, the planar shape is rectangular. Further, in the present invention, the planar shapes of the first polarizer 10, the second polarizer 12, and the thermal control element 14 preferably are each a four-sided shape with 90° corners, and may be quadrate or rectangular. Preferably, the planar shapes are rectangular in accordance with the planar shape of the liquid crystal cell. In the liquid crystal display of the present example, the thermal control element 14 is laminated on the entire surface of the second polarizer 12 on the backlight 13 side. It is to be noted that the present invention is not limited to this. The thermal control element 14 may be laminated on one part of the surface of the second polarizer 12 on a backlight 13 side, such as a part immediately above the backlight 13, as long as the thermal control element 14 can uniformly transfer heat radiated from the backlight 13 to the second polarizer 12 side. The thermal control element 14 may also be arranged on the side (the visible side) of the first polarizer 10, which is opposite to the side on which the liquid crystal cell 11 has been arranged. In such embodiment, heat caused by external light such as sun light also can be controlled when the liquid crystal display is used outdoors.

Any adhesion layers and optical elements may be arranged between the respective components (optical elements) of the liquid crystal display. The "adhesion layer" means one joins and integrates surfaces of the respective optical elements that are adjacent to each other with practically sufficient adhesion and in a practically sufficient adhesion time. Examples of a material for forming the adhesion layer include conventionally known adhesives, pressure-sensitive adhesives, and anchor coat agents. The adhesion layer may have a multilayer structure in which an anchor coat agent layer is formed on the surface of an adhesion object, and an adhesive layer or a pressure-sensitive adhesive layer is formed on the anchor coat agent layer. The adhesion layer may be a thin layer (also referred to as a hair line) that cannot be observed by naked eyes.

Examples of the liquid crystal cell include, according to the classification based on the driving mode of the liquid crystal cell, liquid crystal cells of vertical alignment (VA) mode, twisted nematic (TN) mode, vertical-aligned electrically controlled birefringence (ECB) mode, optically compensated birefringence (OCB) mode, in-plane switching (IPS) mode, and blue mode.

As the liquid crystal cell, it is possible to use a liquid crystal cell as it is that is mounted in a commercially available liquid crystal display, for example. Examples of the commercially available liquid crystal display including the VA mode liquid crystal cell include liquid crystal televisions "AQUOS" (product name) series manufactured by Sharp Corporation, liquid crystal televisions "BRAVIA" (product name) series manufactured by Sony Corporation, and a 32V-type wide-screen liquid crystal television "LN32R51B" (product name) manufactured by SAMSUNG. Examples of a commercially available liquid crystal display including the IPS mode liquid crystal cell include 20V-type wide-screen liquid crystal television "WOOO" (product name) manufactured by Hitachi Ltd. and a 19V-type wide-screen liquid crystal display "PROLITE E481S-1" (product name) manufactured by Iiyama.

The first polarizer and the second polarizer are not particularly limited, and various polarizers can be used (for example, see JP 2008-90263 A).

The surface of the first polarizer, which is opposite to the surface to which the liquid crystal cell has been arranged may be provided with a protective layer or a surface-treated layer. Similarly, the surface of the second polarizer, which is opposite to the surface to which the liquid crystal cell has been arranged may be provided with a protective layer or a surface-treated layer.

As the first polarizer and the second polarizer, commercially available polarizing plates as they are can also be used. Examples of the commercially available polarizing plate include "NPF SEG1224DU" (product name) produced by NITTO DENKO CORPORATION and "NPF SIG1423DU" (product name) produced by the same.

The backlight is not particularly limited, and examples thereof include a cold-cathode tube and a light-emitting diode (LED). The type of the backlight may be any of a direct type, a sidelight type, and a partial light type. The backlights are mounted in, for example, displays for televisions, digital signage, business use, and medical use.

The thermal control element has a thermal conductivity ($\lambda$) calculated by the following formula, of 0.3 W/(m·K) or higher.

$$\lambda = \rho \times c \times \alpha$$

$\rho$: density
$c$: specific heat
$\alpha$: thermal diffusivity

The thermal conductivity can be calculated by measuring α (thermal diffusivity) by a conventionally known method such as a laser flash method or an alternating current calorimetric method. The thermal conductivity is preferably 0.4 W/(m·K) or higher, more preferably 0.6 W/(m·K) or higher. The upper limit of the thermal conductivity is not particularly limited, and is, for example, 500 W/(m·K).

The thermal control element preferably is superior in visible light transmittance (preferably, light transmittance of 50% or more). It is to be noted that the present invention is not limited to this. The light transmittance may be less than 50% as long as light emitted from the backlight can reach uniformly to the second polarizer.

As mentioned above, the thermal control element preferably contains particles with a weight average particle size in the range of 0.001 to 20 μm. The weight average particle size of the particles is more preferably in the range of 0.002 to 15 μm, yet more preferably in the range of 0.003 to 10 μm. The weight average particle size of the particles can be measured by the coulter counter method, for example. For example, the number and the volumes of the particles are determined by measuring each electric resistance of an electrolytic solution corresponding to a volume of a particle at the time when the particle passes through the fine pore using a particle size distribution measuring apparatus (COULTER MULTISIZER (product name) manufactured by Beckman Coulter, Inc.) that is based on a pore electric resistance method, and the weight average particle size is calculated. The thermal conductivity of the particles is preferably 0.3 W/(m·K) or higher, more preferably 0.4 W/(m·K) or higher, and yet more preferably 0.5 W/(m·K) or higher. The upper limit of the thermal conductivity of the particles is not particularly limited, and is, for example, 500 W/(m·K). Examples of the particles include particles of alumina, magnesia, beryllia, crystalline silica, molten silica, boron nitride (hexagonal crystal), boron nitride (cubic crystal), aluminum nitride, silicon carbide, boron carbide, titanium carbide, silicon nitride, mullite, diamond, aluminum, copper, and iron. The particles may be subjected to surface modification in view of controlling dispersibility and thermal conductivity.

A method for forming the thermal control element is not particularly limited, and the thermal control element can be formed by forming a film (hereinafter referred to as an "applied film") by applying a formation material containing the particles and the resin for forming a thermal control element on a transparent film base, and curing the applied film. It is preferable that the applied film is dried prior to the curing. The drying may be natural air drying, air drying conducted by blowing a wind, drying by heating, or a combination thereof. A means for curing the applied film is not particularly limited, and ionizing radiation curing is preferable. In the means, various types of active energy can be used, and ultraviolet light is preferable. Preferred examples of the energy radiation source include radiation sources such as high-pressure mercury lamps, halogen lamps, xenon lamps, metal halide lamps, nitrogen lasers, electron beam accelerators, and radioactive elements. The amount of irradiation with the energy radiation source is preferably 50 to 5000 mJ/cm$^2$ in terms of accumulative exposure at an ultraviolet wavelength of 365 nm. When the amount of irradiation is at least 50 mJ/cm$^2$, curing of the applied film becomes sufficient, and a hardness of the thermal control element to be formed becomes sufficient. On the other hand, when the amount of irradiation is 5000 mJ/cm$^2$ or lower, a thermal control element to be formed can be prevented from being colored, and transparency of the thermal control element can be improved. The transparent film base may also serve as a protective layer. The thickness of the thermal control element is not particularly limited, and is, for example, in the range of 10 to 200 μm, more preferably in the range of 20 to 150 μm, and yet more preferably in the range of 30 to 100 μm.

As the transparent film base, triacetyl cellulose (TAC), polyethylene terephthalate (PET), acryl, acrylonitrile-styrene (AS), acrylonitrile acrylic rubber styrene (AAS), acrylonitrile-butadiene-styrene (ABS), a cyclic olefin copolymer (COC), a cyclic olefin polymer (COP), ethylene-vinyl alcohol (EVOH), ethylene-vinyl acetate (EVA), epoxy (EP), methacryl-styrene (MS), polyarylate (PAR), polyether sulfone (PES), polypropylene (PP), polystyrene (PS), polycarbonate (PC), polymethylmethacrylate (PMMA), polybutylene terephthalate (PBT), polyethylene naphthalate (PEN), hydrogenated styrene-butadiene-styrene (SBS), polyamide (PA), polyethylene (PE), polymethylpentene (PMP), polysulfone (PSU), low-density polyethylene (LDPE), or polyurethane can be used, for example.

As the resin for forming a thermal control element, one having high transparency is preferable. Examples of the resin include a urethane acrylic resin, a urethane resin, an acrylic resin, an epoxy resin, a cellulose resin, a norbornene resin, an ester resin, an amide resin, and a carbonate resin. The resins for forming a thermal control element may be used alone or in a combination of two or more of them.

A method for applying the formation material on the transparent film base can be, for example, a method in which a liquid prepared by dispersing the particles in a solution prepared by dissolving the resin for forming a thermal control element in a solvent is applied. The applying can be carried out by an appropriate method such as spin coating, roller coating, flow coating, printing, dip coating, film flow-expanding, bar coating, or gravure printing.

The solvent is not particularly limited as long the resin for forming a thermal control element can be dissolved in the solvent, and can be selected as appropriate. Examples of the solvent include ethyl acetate, methyl isobutyl ketone, toluene, methyl ethyl ketone, cyclohexane, ethanol, and water. The solvents may be used alone or in a combination of two or more of them. The resin for forming a thermal control element preferably in the range of 10 to 90 parts by weight, more preferably in the range of 20 to 80 parts by weight, and yet more preferably in the range of 30 to 70 parts by weight is added with respect to 100 parts by weight of the solvent, because a viscosity of the solution becomes suitable for applying.

The amount of the particles to be added is, for example, in the range of 10% to 90% by volume, preferably in the range of 20% to 80% by volume, and more preferably in the range of 30% to 70% by volume, with respect to the liquid.

In the above-mentioned method for forming a thermal control element, the particles are dispersed in the resin for forming a thermal control element. It is to be noted that the present invention is not limited to this. In the present invention, the particles may be arranged into a layer on a layer obtained by forming the resin for forming a control element into a layer. On the other hand, in the present invention, some of the particles are dispersed in the resin for forming a thermal control element, and remaining particles may be arranged into a layer on a layer obtained by forming the resin for forming a thermal control element into a layer. A method for arranging the particles into a layer on a layer obtained by forming the resin for forming a thermal control element into a layer is not particularly limited, and examples thereof include a coating method, a multilayer extrusion method, a casting method, a layering method, and a laminate method.

The thermal control element may be arranged between the second polarizer and the air layer. The thermal control element may also serve as a protective layer of the second polarizer.

Figure 2:
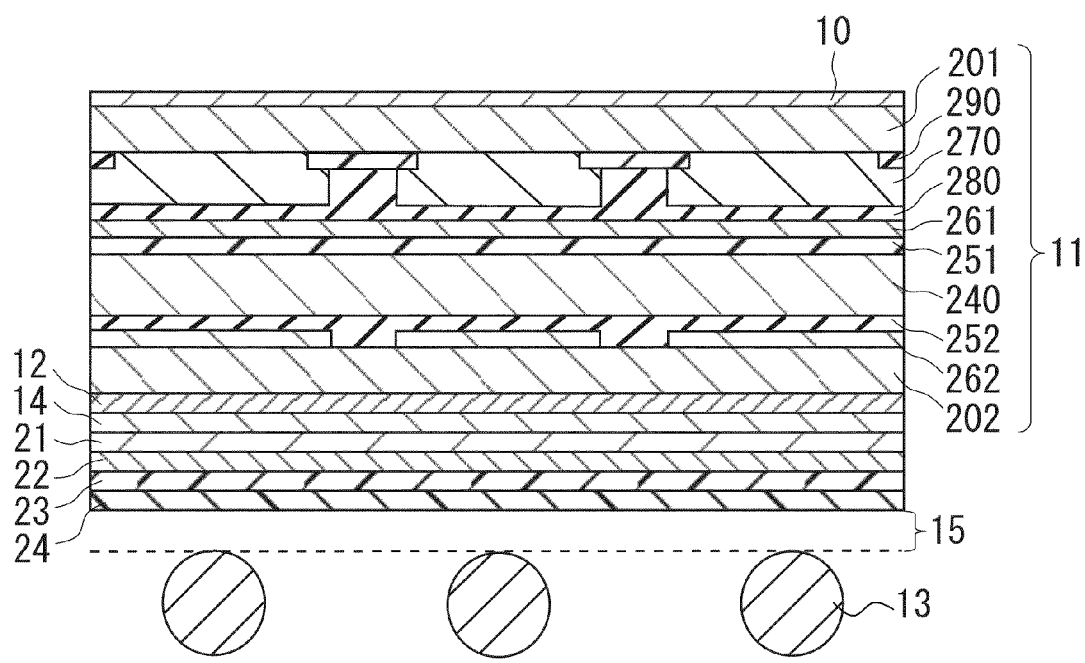
FIG. 2 is a schematical sectional view showing another example of the configuration of a liquid crystal display of the present invention.
Figure 3:
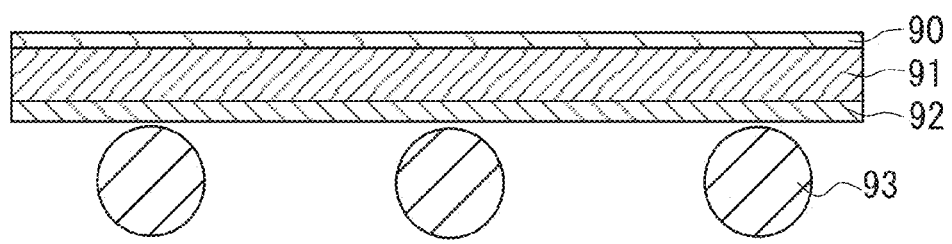
FIG. 3 is a schematic sectional view showing an example of the configuration of a conventional liquid crystal display.

Another example of the configuration of the liquid crystal display of the present invention is shown in FIG. 2. In FIG. 2, the parts identical to those in FIG. 1 are denoted by the identical reference numerals. As shown in FIG. 2, this liquid crystal display includes a first polarizer 10, a liquid crystal cell 11, a second polarizer 12, a thermal control element 14, a first brightness enhancement film 21, a second brightness enhancement film 22, a diffusion sheet 23, a diffusion plate 24, an air layer 15, and a backlight 13, as main components. The liquid crystal cell 11 includes a liquid crystal layer 240 in the middle thereof. A first alignment film 251 is arranged on one side of the liquid crystal layer 240, and a second alignment film 252 is arranged on the other side of the liquid crystal layer 240. A first transparent electrode 261 is arranged on the outer side of the first alignment film 251, and a second transparent electrode 262 is arranged on the outer side of the second alignment film 252. Color filters 270 of, for example, R (red), G (green), and B (blue) in a predetermined sequence and the black matrix 290 are arranged on the outer side of the first transparent electrode 261 via a protective film 280. A first substrate 201 is arranged on the outer side of the color filters 270 and a black matrix 290, and a second substrate 202 is arranged on the outer side of the second transparent electrode 262. The first polarizer 10 is arranged on one side of the liquid crystal cell 11, and the second polarizer 12 is arranged on the other side of the liquid crystal cell 11. The side on which the first polarizer 10 has been arranged is a visible side, and the side on which the second polarizer 12 has been arranged is a backlight 13 side. The thermal control element 14 is arranged on the second polarizer 12 on the backlight 13 side. Between the thermal control element 14 and the backlight 13, the first brightness enhancement film 21, the second brightness enhancement film 22, the diffusion sheet 23, the diffusion plate 24, and the air layer 15 are arranged in order from the thermal control element 14 side. In FIG. 2, the air layer 15 is space formed between the backlight 13 and the diffusion plate 24. In FIG. 2, the thickness of the air layer 15 is the distance of the upper end of the backlight 13 to the under surface of the diffusion plate 24. In the liquid crystal display of this example, a direct-type backlight is employed as the backlight. However, the present invention is not limited to this. The backlight may be, for example, a sidelight-type backlight. The sidelight-type backlight further includes at least a light guide plate and a light reflector besides the configuration of the direct-type backlight. It is to be noted that some of the components illustrated in FIG. 2 may be abbreviated or replaced with other optical elements according to the uses such as illuminating type of the liquid crystal display and driving mode of the liquid crystal cell as long as the effects of the present invention can be obtained.

In the liquid crystal display shown in FIG. 2, the place in which the element 14 is mounted is not particularly limited as long as the place is between the second polarizer 12 and the air layer 15. The place in which the thermal control element 14 is mounted may be, for example, between the first brightness enhancement film 21 and the second brightness enhancement film 22, between the second brightness enhancement film 22 and the diffusion sheet 23, between the diffusion sheet 23 and the diffusion plate 24, or between the diffusion plate 24 and the air layer 15. Besides being arranged between the second polarizer 12 and the air layer 15, the thermal control element 14 may further be arranged on the side (visible side) of the first polarizer 10, which is opposite to the side on which the liquid crystal cell 11 has been arranged.

The liquid crystal display of the present invention may be a transmission type liquid crystal display in which the screen is seen by being irradiated with light from the backlight side of the liquid crystal panel, may be a reflection type liquid crystal display in which the screen is seen by being irradiated with light from the visible side of the liquid crystal panel, or may be a semi-transmission type liquid crystal display having the properties of both the transmission type and the reflection type liquid crystal displays.

The liquid crystal display of the present invention is applicable to any suitable use. Examples of the use thereof include: office automation equipment such as computer monitors, notebook computers, and copy machines; portable devices such as mobile phones, watches, digital cameras, personal digital assistants (PDAs), and portable game devices; household electric appliances such as video cameras, televisions, and microwave ovens; vehicle-mounted devices such as back monitors, car navigation system monitors, and car audios; exhibition devices such as information monitors for commercial stores; security devices such as surveillance monitors; and nursing care and medical devices such as nursing-care monitors and medical monitors.

EXAMPLES

Next, the examples of the present invention are described together with the comparative examples. The present invention is not at all limited by the following examples and comparative examples. Various physical properties and characteristics in the respective examples and comparative examples were evaluated or measured by the following methods.

(Thermal Conductivity)

The thermal conductivity was measured using "AI-PHASE MOBILE" (product name) produced by ai-Phase Co. Ltd.

(Brightness Ratio)

After 30 minutes from turning on a backlight, black display was displayed, and a brightness ratio was calculated based on an equation: brightness ratio=maximum brightness/minimum brightness, using a brightness distribution measurement apparatus ("CA-1500" (product name) manufactured by Konica Minolta Holdings, Inc.). In this case, a display surface of a liquid crystal display was divided into sixteen pieces (horizontal four sections×vertical four sections), and the lowest value of the brightness in the central four sections was referred to as the minimum brightness and the highest value of the brightness in a plane of the display surface was referred to as the maximum brightness.

(Weight Average Particle Size of Particles)

The weight average particle size was measured by the coulter counter method. In particular, the number and the volumes of particles were determined by measuring each electric resistance of an electrolytic solution corresponding to a volume of a particle at the time when the particle passes through the fine pore using a particle size distribution measuring apparatus ("COULTER MULTISIZER" (product name) manufactured by Beckman Coulter, Inc.) that is based on a pore electric resistance method, and the weight average particle size was calculated.

(Thickness)

The thickness was measured using a digital micrometer "KC-351C type" manufactured by Anritsu Corporation.

Example 1

Production of Thermal Control Element (Thermal Control Film)

A liquid was prepared by dispersing 38% by volume alumina particles with a weight average particle size of 0.3 μm in a solution prepared by dissolving a 40% by weight urethane acrylate ultraviolet curable resin in ethyl acetate. This liquid was applied on a TAC film, and the applied film was heated for 5 minutes at 100° C. Thus, the applied film was dried. Thereafter, the applied film was irradiated with ultraviolet light at an accumulated light intensity of 300 mJ/cm², and thereby the applied film was cured to form a 22-μm thick thermal control element (thermal control film). The thermal control film had a thermal conductivity of 15 W/(m·K).

(Mounting in Liquid Crystal Display)

Figure 4:
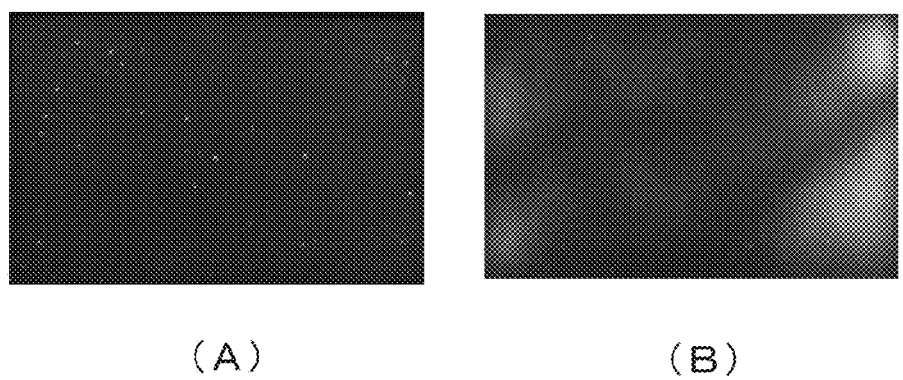
FIG. 4(A) is a photograph showing a black brightness distribution of a liquid crystal display in an example of the present invention.
FIG. 4(B) is a photograph showing a black brightness distribution of a liquid crystal display in a comparative example of the present invention.

Provided was a commercially available wide-screen 32-inch type (687 mm×412 mm) liquid crystal display including a liquid crystal cell 11 of a VA mode and having the same configuration as that shown in FIG. 2 except that a protective layer (a TAC film) was included as substitute for a thermal control element 14. In the liquid crystal display, a first brightness enhancement film 21 was "DBEF" (product name) manufactured by 3M, and a second brightness enhancement film 22 was "BEF" (product name) manufactured by 3M. A thermal conductivity of the protective layer was W/(m·K), that of the first brightness enhancement film 21 was 0.25 W/(m·K), that of the second brightness enhancement film 22 was 0.2 W/(m·K), that of a diffusion sheet 23 was 0.19 W/(m·K), and that of a diffusion plate 24 was 0.2 W/(m·K). A backlight of the liquid crystal display was turned on, and the temperature of the liquid crystal display was determined using "THERMOVISION CPA-1200" (product name) manufactured by CHINO corporation at a distance of about 2 m from the backlight, and was 45° C. The thermal control element 14 was mounted in the liquid crystal display as substitute for the protective layer, as shown in FIG. 2, and a 2-mm thick air layer 15 was provided between the diffusion plate 24 and the backlight 13. Then, black display was displayed, and uniformity in black display was determined by visual check. The display was uniform with no irregularity, as shown in FIG. 4(A).

Example 2

Production of Thermal Control Element (Thermal Control Film)

A liquid was prepared by dispersing 52% by volume boron nitride particles with a weight average particle size of 1.4 μm in a solution prepared by dissolving a 40% by weight urethane acrylate ultraviolet curable resin in methyl isobutyl ketone. This liquid was applied on a TAC film, and the applied film was heated for 5 minutes at 100° C. Thus, the applied film was dried. Thereafter, the applied film was irradiated with ultraviolet light at an accumulated light intensity of 300 mJ/cm², and thereby the applied film was cured to form 28-μm thick thermal control element (thermal control film). The thermal control film had a thermal conductivity of 150 W/(m·K).

(Mounting in Liquid Crystal Display)

The same liquid crystal display as that used in Example 1 was provided. The thermal control element 14 was mounted in the liquid crystal display as substitute for a protective layer, as shown in FIG. 2, and a 2-mm thick air layer 15 was provided between a diffusion plate 24 and a backlight 13. Then, black display was displayed, and uniformity in black display was determined by visual check. The display was uniform with no irregularity.

Example 3

Production of Thermal Control Element (Thermal Control Film)

A liquid was prepared by dispersing 52% by volume silica particles with a weight average particle size of 0.2 μm in a solution prepared in the same manner as in Example 1. This liquid was applied on a TAC film, and the applied film was heated for 5 minutes at 100° C. Thus, the applied film was dried. Thereafter, the applied film was irradiated with ultraviolet light at an accumulated light intensity of 300 mJ/cm², and thereby the applied film was cured to form a 22-μm thick thermal control element (thermal control film). The thermal control film had a thermal conductivity of 1.2 W/(m·K).

(Mounting in Liquid Crystal Display)

The same liquid crystal display as that used in Example 1 was provided. The thermal control element 14 was amounted in the liquid crystal display as substitute for a protective film, as shown in FIG. 2, and a 2-mm thick air layer 15 was provided between a diffusion plate 24 and a backlight 13. Then, black display was displayed, and uniformity in black display was determined by visual check. The display was uniform with no irregularity.

Example 4

Production of Thermal Control Element (Thermal Control Film)

A liquid was prepared by dispersing 42% by volume aluminum nitride particles with a weight average particle size of 1.1 μm in a solution prepared by dissolving a 30% by weight urethane acrylate ultraviolet curable resin in ethyl acetate. This liquid was applied on a PET film, and the applied film was heated for 5 minutes at 100° C. Thus, the applied film was dried. Thereafter, the applied film was irradiated with ultraviolet light at an accumulated light intensity of 300 mJ/cm², and thereby the applied film was cured to form 31-μm thick thermal control element (thermal control film). The thermal control film had a thermal conductivity of 120 W/(m·K).

(Mounting in Liquid Crystal Display)

The same liquid crystal display as that used in Example 1 was provided. The thermal control element 14 was mounted in the liquid crystal display as substitute for a protective layer, as shown in FIG. 2, and a 2-mm thick air layer 15 was provided between a diffusion plate 24 and a backlight 13. Then, black display was displayed, and uniformity in black display was determined by visual check. The display was uniform with no irregularity.

Example 5

Production of Thermal Control Element (Thermal Control Film)

A liquid was prepared by dispersing 10% by volume aluminum nitride particles with a weight average particle size of 0.9 μm in a solution prepared in the same manner as in Example 4. This liquid was applied on an acrylic film, and the applied film was heated for 5 minutes at 100° C. Thus, the applied film was dried. Thereafter, the applied film was irradiated with ultraviolet light at an accumulated light intensity of 300 mJ/cm², and thereby the applied film was cured to form 20-μm thick thermal control element (thermal control film). The thermal control film had a thermal conductivity of 0.5 W/(m·K).

(Mounting in Liquid Crystal Display)

The same liquid crystal display as that used in Example 1 was provided. The thermal control element 14 was mounted in the liquid crystal display as substitute for a protective layer, as shown in FIG. 2, and a 2-mm thick air layer 15 was provided between a diffusion plate 24 and a backlight 13.

Then, black display was displayed, and uniformity in black display was determined by visual check. The display was uniform with no irregularity.

Comparative Example 1

The same liquid crystal display as that used in Example 1 was used, a protective layer was not substituted by a thermal control film, and a 2-mm thick air layer 15 was provided between a diffusion plate 24 and a backlight 13. Then, black display was displayed, and uniformity in black display was determined by visual check. The display was nonuniform with irregularity, as shown in FIG. 4(B).

Comparative Example 2

Provided was a commercially available wide-screen 46-inch type liquid crystal display including a liquid crystal cell 11 of a VA-mode and having the same configuration as that shown in FIG. 2 except that a protective layer (a TAC film) was included as substitute for a thermal control element 14, and a third brightness enhancement film and a fourth brightness enhancement film were included as substitute for a diffusion sheet 23. In the liquid crystal display, a first brightness enhancement film 21 was "DBEF" (product name) manufactured by 3M, and a second brightness enhancement film 22, the third brightness enhancement film, and the fourth brightness enhancement film were each "BEF" (product name) manufactured by 3M. The thermal conductivity of the protective layer was 0.17 W/(m·K) that of the first brightness enhancement film 21 was 0.26 W/(m·K), that of the second brightness enhancement film 22 was 0.2 W/(m·K), that of the third brightness enhancement film was 0.23 W/(m·K), that of the fourth brightness enhancement film was 0.22 W/(m·K), and that of a diffusion plate 24 was 0.2 W/(m·K). A backlight of the liquid crystal display was turned on, and the temperature of the liquid crystal display was determined using "THERMOVISION CPA-1200" (product name) manufactured by CHINO corporation at a distance of about 2 m from the backlight, and was 48° C. In the liquid crystal display, a 2-mm thick air layer 15 was provided between the diffusion plate 24 and the backlight 13, as shown in FIG. 2. Then, black display was displayed, and uniformity in black display was determined by visual check. The display was nonuniform with irregularity.

Comparative Example 3

Provided was a commercially available wide-screen 32-inch type liquid crystal display including a liquid crystal cell 11 of a VA mode and having the same configuration as that shown in FIG. 2 except that a thermal control element 14 was not included. In the liquid crystal display, a first brightness enhancement film 21 was "DBEF" (product name) manufactured by 3M, and a second brightness enhancement film 22 was "BEF" (product name) manufactured by 3M. The thermal conductivity of the first brightness enhancement film 21 was 0.25 W/(m·K), that of the second brightness enhancement film 22 was 0.2 W/(m·K) that of a diffusion sheet 23 was 0.19 W/(m·K) and that of a diffusion plate 24 was 0.2 W/(m·K). A backlight of the liquid crystal display was turned on, and the temperature of the liquid crystal display was determined using "THERMOVISION CPA-1200" (product name) manufactured by CHINO corporation at a distance of about 2 m from the backlight, and was 45° C. In the liquid crystal display, a 2-mm thick air layer 15 was provided between the diffusion plate 24 and the backlight 13, as shown in FIG. 2. Then, black display was displayed, and uniformity in black display was determined by visual check. The display was nonuniform with irregularity.

Comparative Example 4

Provided was a commercially available wide-screen 46-inch type liquid crystal display including a liquid crystal cell 11 of a VA mode and having the same configuration as that shown in FIG. 2 except that a thermal control element 14 was not included, and a third brightness enhancement film and a fourth brightness enhancement film were included as substitute for a diffusion sheet 23. In the liquid crystal display, a first brightness enhancement film 21 was "DBEF" (product name) manufactured by 3M, and a second brightness enhancement film 22, the third brightness enhancement film, and the fourth brightness enhancement film were each "BEF" (product name) manufactured by 3M. The thermal conductivity of the first brightness enhancement film 21 was 0.26 W/(m·K), that of the second brightness enhancement film 22 was 0.2 W/(m·K), that of the third brightness enhancement film was 0.23 W/(m·K), that of the fourth brightness enhancement film was 0.22 W/(m·K), and that of a diffusion plate 24 was 0.2 W/(m·K). A backlight of the liquid crystal display was turned on, and the temperature of the liquid crystal panel was determined using "THERMOVISION CPA-1200" (product name) manufactured by CHINO corporation at a distance of about 2 m from the backlight, and was 48° C. In the liquid crystal display, a 2-mm thick air layer 15 was provided between the diffusion plate 24 and the backlight 13, as shown in FIG. 2. Then, black display was displayed, and uniformity in black display was determined by visual check. The display was nonuniform with irregularity.

Thermal control films of the examples and measurement results of brightness ratios of the examples and the comparative examples are shown in Table 1 below. In the liquid crystal displays of Examples 1 to 5, including thermal control films, brightness ratios were 1.3 or less, which was low, and brightness in black display was uniform. In contrast, in the liquid crystal displays of Comparative Examples 1 to 4, including no thermal control film, brightness ratios were 1.9 or more, which was high, and brightness in black display was nonuniform.

TABLE 1

| | Thermal control film | | | |
|---|---|---|---|---|
| | Particles | Transparent film base | Brightness ratio | Visual evaluation |
| Ex. 1 | Alumina | TAC | 1.2 | Uniform |
| Ex. 2 | Boron nitride | TAC | 1.1 | Uniform |
| Ex. 3 | Silica | TAC | 1.2 | Uniform |
| Ex. 4 | Aluminum nitride | PET | 1.1 | Uniform |
| Ex. 5 | Aluminum nitride | Acryl | 1.3 | Uniform |
| Comp. Ex. 1 | — | | 2.3 | Nonuniform |
| Comp. Ex. 2 | — | | 2.2 | Nonuniform |
| Comp. Ex. 3 | — | | 2.5 | Nonuniform |
| Comp. Ex. 4 | — | | 1.9 | Nonuniform |

As described above, the liquid crystal display of the present invention can suppress a temperature irregularity in planes of the liquid crystal cell and the polarizers, caused by heat radiated from a backlight and depolarization caused by the temperature irregularity, and reduce appearance defects as compared with a conventional liquid crystal display. There is no limitation on the use of the liquid crystal display of the present invention, and it is applicable to a wide range of fields.

The embodiments and the examples are illustrations, and do not limit the present invention. The present invention may be achieved by other embodiments as long as the purpose and the basic characteristics of the present invention are not departed. The scope of the invention is defined by the appended claims. Various changes and equivalents, which are understood by those skilled in the art in the scope of the present invention can be applied to the configuration and detail of the present invention.

REFERENCE CHARACTERS LIST 10, 90 first polarizer
11, 91 liquid crystal cell
12, 92 second polarizer
13, 93 backlight
14 thermal control element (thermal control film)
15 air layer

What is claimed is:

1. A liquid crystal display, comprising:
a first polarizer;
a liquid crystal cell;
a second polarizer;
a thermal control element with a thermal conductivity of 0.3 W/(m·K) or higher;
an air layer; and
a backlight, being arranged in this order,
wherein the thermal control element is formed from a formation material containing particles and a urethane acrylate ultraviolet curable resin and the particles are dispersed in the urethane acrylate ultraviolet curable resin.

2. The liquid crystal display according to claim 1, wherein the thermal control element contains particles with a weight average particle size in a range of 0.001 to 20 μm.

3. The liquid crystal display according to claim 1, wherein the particles have a thermal conductivity of 0.3 W/(m·K) or higher.

4. The liquid crystal display according to claim 1, wherein the particles are at least one type of particles selected from the group consisting of alumina particles, boron nitride particles, silica particles, and aluminum nitride particles.

5. A liquid crystal display, comprising:
a first polarizer;
a liquid crystal cell;
a second polarizer;
a thermal control element with a thermal conductivity of 0.3 W/(m·K) or higher;
an air layer; and
a backlight, being arranged in this order,
wherein the thermal control element is formed from particles arranged in a layer on a layer formed from a resin.

6. The liquid crystal display according to claim 5, wherein the resin is a urethane acrylate ultraviolet curable resin.

7. The liquid crystal display according to claim 1, wherein the thermal control element has a thickness in a range of 10 to 200 μm.

8. The liquid crystal display according to claim 1, wherein the air layer has a thickness in a range of 1 μm to 1 cm.

9. The liquid crystal display according to claim 1, further comprising:
at least one protective layer, being arranged at at least one location selected from the group consisting of between the second polarizer and the thermal control element and between the thermal control element and the backlight.

10. The liquid crystal display according to claim 1, wherein the thermal control element is a thermal control film.

11. The liquid crystal display according to claim 1, wherein the thermal control element is laminated on the second polarizer.

12. The liquid crystal display according to claim 5, wherein the particles have a weight average particle size in a range of 0.001 to 20 μm.

13. The liquid crystal display according to claim 5, wherein the particles have a thermal conductivity of 0.3 W/(m·K) or higher.

14. The liquid crystal display according to claim 5, wherein the particles are at least one type of particles selected from the group consisting of alumina particles, boron nitride particles, silica particles, and aluminum nitride particles.

15. The liquid crystal display according to claim 5, wherein the thermal control element has a thickness in a range of 10 to 200 μm.

16. The liquid crystal display according to claim 5, wherein the air layer has a thickness in a range of 1 μm to 1 cm.

17. The liquid crystal display according to claim 5, further comprising:
at least one protective layer, being arranged at least one location selected from the group consisting of between the second polarizer and the thermal control element and between the thermal control element and the backlight.

18. The liquid crystal display according to claim 5, wherein the thermal control element is a thermal control film.

19. The liquid crystal display according to claim 5, wherein the thermal control element is laminated on the second polarizer.

* * * * *